United States Patent [19]

Aruanno

[11] 4,004,746
[45] Jan. 25, 1977

[54] CASSETTE MAGAZINE FOR MOTION-PICTURE FILMS

[75] Inventor: Angela Aruanno, Milan, Italy
[73] Assignee: Lamy S.r.l., Milan, Italy
[22] Filed: Jan. 23, 1974
[21] Appl. No.: 435,958

[30] Foreign Application Priority Data

Jan. 25, 1973 Italy .................. 19585/73
Nov. 21, 1973 Italy .................. 31525/73

[52] U.S. Cl. ............... 242/55.19 A; 352/78 R; 352/128
[51] Int. Cl.² ............................. G11B 23/10
[58] Field of Search .......... 242/55.19 A, 55.18; 352/78 R, 72, 128

[56] References Cited

UNITED STATES PATENTS

| | | | |
|---|---|---|---|
| 1,751,192 | 3/1930 | Cowie | 242/55.18 |
| 2,778,637 | 1/1957 | Cash | 242/55.19 A |
| 2,864,611 | 12/1958 | Gray | 242/55.19 A |
| 2,908,769 | 10/1959 | Fonda | 242/55.19 A X |
| 3,065,310 | 11/1962 | Cross | 242/55.19 A X |
| 3,252,670 | 5/1966 | Smith | 242/55.19 A |
| 3,568,943 | 3/1971 | Robak | 242/55.19 A |
| 3,591,271 | 7/1971 | Shropshire | 352/78 R |
| 3,788,574 | 1/1974 | Wakeman et al. | 242/55.19 A |
| 3,863,853 | 2/1975 | Umeda | 242/55.19 A |

FOREIGN PATENTS OR APPLICATIONS

| | | | |
|---|---|---|---|
| 904,697 | 3/1945 | France | 352/128 |
| 849,129 | 8/1939 | France | 352/78 R |

Primary Examiner—Billy S. Taylor
Attorney, Agent, or Firm—Fleit & Jacobson

[57] ABSTRACT

Cassette magazine for motion-picture films comprising: a flat container having on a sidewall thereof a longitudinal sliding and exposing opening for the film drawn by conventional means of the projector, and a disc rotably carried in the container and having a control or drive portion thereof which can be accessed to through an opening formed in a sidewall of said magazine, wherein the disc carrying the film roll has on the side facing inwardly of the container a coaxial sprocket, about which the inner turns of the film are arranged; at least one guide roller for the unwound film length; a pressing member of the film against the projection window; at least one guide roller for carrying the projected film towards the external periphery of the film roll and rewinding it on the outer turns of the film roll, guide tabs being provided on the lid and other means for maintaining the film turns at matching condition in the zone about the sprocket.

6 Claims, 4 Drawing Figures

CASSETTE MAGAZINE FOR MOTION-PICTURE FILMS

This invention relates to a cassette magazine for motion-picture films of continuous cycle design, enabling a full automation of the projectors and/or cinematographic monitors or viewers, eliminating time losses and problems in assembling the film-roll on the projector.

The present invention is directed to provide a magazine of the above character, wherein a continuous cycle motion-picture film is completely enclosed and protected in the container, with the winding and unwinding control or drive for the cassette film being supplied at the outside and independently of the film feeding drive provided by the usual claw of a motion-picture projector.

It is a further object of the present invention to provide a magazine for motion-picture films of the above mentioned character, incorporating means for reflecting and illuminating the film pictures exposed through an opening in said cassette by means of a light beam from an external source.

A cassette magazine according to the invention for a continuous cycle motion-picture film comprises: a flat container having on a sidewall thereof a longitudinal film sliding and exposing opening, the film being drawn or trailed by conventional means on the projector, and a disc rotatably carried in the container and having a control or drive portion thereof which can be accessed to through an opening in a sidewall of said magazine, characterized in that the disc carrying the film roll has on that side facing inwardly of the container a coaxial spool, the inner turns of said film being arranged thereabout; at least one guide roller for the unwound film section or length; a presser pad member for the film against the projection film trap; at least one guide roller for conveying the projected film to the external periphery of the film roll and rewinding it up on the outer turns of the film roll, guide tabs being provided on the lid and projecting to the film for maintaining the turns at a matched condition about said spool.

The magazine according to the invention will now be described in greater detail with reference to the accompanying drawings showing two embodiments, and in which.

Figure 1:
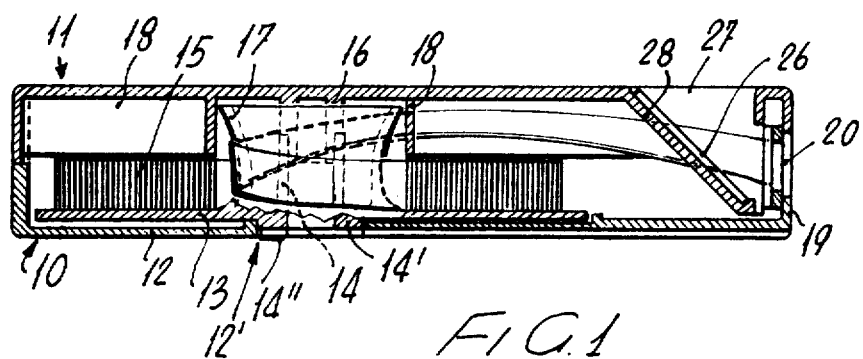
FIG. 1 is a diametrical sectional view of the magazine according to a first embodiment.
Figure 2:
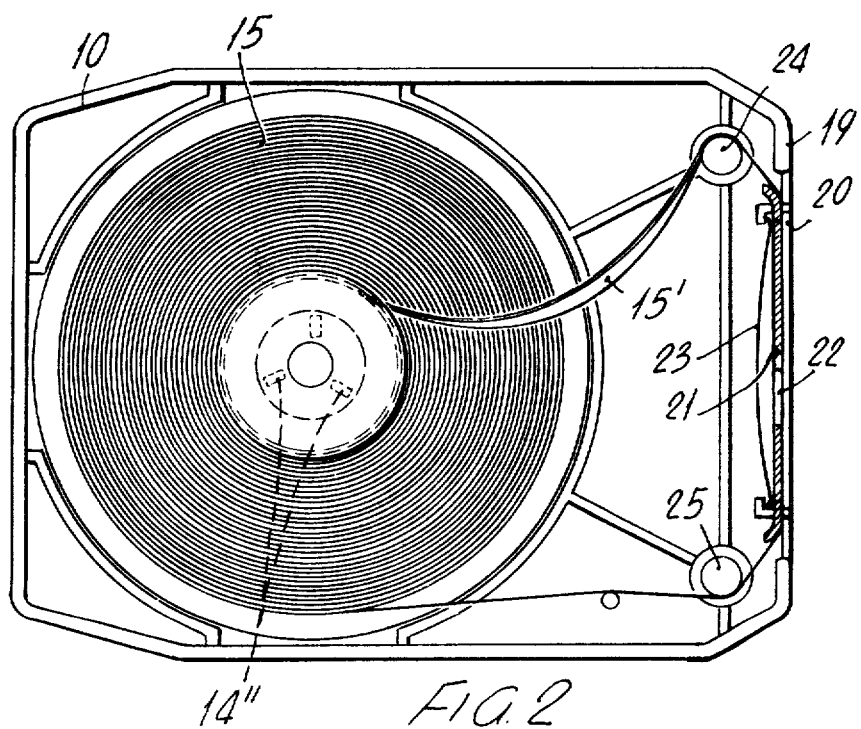
FIG. 2 is a side view of the magazine shown in FIG. 1 with the lid removed.

As shown in FIGS. 1 and 2, a magazine for motion-picture films according to the invention, substantially comprises a housing of a substantially rectangular contour having rounded corners, formed of two separable parts, particularly a first part or box 10 and a second part or lid 11 associating with the former along the periphery or sidewalls of the magazine.

Internally of the housing 10 and adjacent the bottom wall 12 provided with a hole 12' is idly rotatably mounted a disc 13 provided with a pin 14, of which the end 14' can be accessed to from the outside of the container or housing 10 to permit a positive external control or drive for the disc 13 and motion-picture film 15 carried thereby and continuously wound up, as described in the following.

The pin or hub 14 of disc 13 is hollow and guided at the opposite end by a coaxial pin 16 partially entering it and fast with the magazine lid 11.

As shown in FIGS. 1 and 2, at its end externally of the box 10 said pin 14 has three lugs or projections 14'' angularly spaced apart by 120°, for engaging a corresponding drawing member of the drive mechanism on a projector.

It will be also seen from FIG. 1 that coaxially with and externally of the hollow pin 14 a spool 17 is provided and extends with its free end nearly to the inner wall of lid 11.

About the spool 17, which is of circular cross-section, the turns are arranged for the motion-picture film 15, the latter continuously unwinding and rewinding within the magazine.

The spool 17, about which the motion-picture film turns 15 are arranged, is of a profile suitable to cause the separation of only the innermost turn from the other turns of the film as the latter is unwinding; this profile may be of cylindrical or conical shape with the taper converging to the disc 13. Preferably, as shown in FIG. 1, said spool 17 has a substantially conical profile connecting through an arc of circle to the surface of disc 13, so as to promote the separation of the film pertaining to the innermost turn, avoiding the concurrent separation of the adjoining turns which would otherwise become jammed about the spool, preventing the film from exiting. A number of ribs or tabs 18 cooperate for correctly unwinding the film, such ribs or tabs being arranged internally of the container on the lid 11 and providing for maintaining at perfect matching condition the film turns 15 not yet unwound or being rewound. In FIG. 1 it will be seen that the inner end of ribs 18 terminate at the starting location for the connection between said spool 17 and disc 13, this contributing to a correct unwinding of the film.

On its front peripheral surface 19 the magazine also has a longitudinal slit 20, the width of which is equal to or slightly larger than that of the motion-picture film 15, for exposing the latter through the optical system of the projector and drawing thereof by a standard drive claw (not shown) forming part of the projecting machine.

In front of the longitudinal film exposing opening is provided a presser pad member 21, along which the motion-picture film is slidable, as shown in FIG. 2, and in which an aperture or window 22 is formed for illuminating the film pictures or frames by a light beam from a light supply externally of the magazine. The presser pad 21, which is of a shape suitable to the type of film used, is constantly urged by a spring means 23, schematically shown in FIG. 2, against the parallel edges of said opening 20, so that the film is maintained at a quite planar condition in the section or length corresponding thereto. Adjacent the ends of opening 20, guide rollers 24 and 25 are mounted and serve for shifting the incoming length and the return length of the motion-picture film, respectively, so that the latter can be continuously unwound and rewound. From FIG. 2, it will be also seen that a loop 15' is formed by the film 15 between said spool 17 and guide roller 24, this loop 15' providing a reserve or supply for avoiding and absorbing or taking up any tractive actions which could be exerted on the film due to a misfunction of the control or drive members. The two guide rollers 24 and 25 are clearly shown in FIG. 2, and are substantially stationary and molded from the magazine container. However, if desired, said guide rollers 24 and 25 could be also rotatably and idly mounted, and have the outer surface thereof quite smooth, or provided with a suitable toothing for engagement in the corresponding side perforation of the film 15.

As above mentioned, the frame of film 15 are illuminated by a light beam from the outside and passing through the window 22 in the presser pad 21 to the optical system of a projector, in which said magazine is inserted.

To this end, in the magazine at the window 22 in the presser pad 21 a reflecting means is positioned, such as an inclined mirror 26 (FIG. 1), receiving light from a source externally of the magazine, through an opening 27 of its lid, and shifting or reflecting it to the window 22 in the presser pad 21, so as to pass through the film frames being time by time exposed by the movement of said film. This mirror 26 can be indifferently mounted on either of the two housing portions 10 or or 11, for example on an inwardly sloping projection or lug 28 of said lid 11, as shown in FIG. 1. The opening 27 could be closed by a slide or other transparent means for avoiding or limiting any dust entrance in the magazine.

Referring to FIGS. 1 and 2, the path will now be described as followed by the film in the magazine.

From FIG. 1, it will be seen that the turns of film 15, arranged about the spool 17, are maintained concentric, matching and perfectly planar by the aligning ribs or tabs 18. Therefore, because of the rotational drive imparted to the disc 13 and spool 17, and hence to the assembly of the film turns 15, and also to the drawing effect from the claw of the like of a projector at the longitudinal opening 20, the innermost film turn spirally unwinds about the external surface of said spool 17, then forming a loop or reserve 15' for avoiding an undue tractive action on the film; subsequently, this innermost turn is gripped by the guide roller 24 and thereby caused to pass along the presser pad 21 in front of the opening 20 and then backward shifted again by the roller 25 and guided thereby to continuously wind up again on the outer film turns. Thus, a continuous film unwinding and rewinding control is provided, independently of the traction being exerted on the film by the claw of the projector feeding device.

From the plan view of FIG. 2 it will be seen that the magazine housing 10, 11 is of a substantially rectangular shape having beveled corners to facilitate its introduction and removal from the suitable housing of a projector.

Thus, from the foregoing and as shown in the accompanying drawings it will be appreciated that a novel cassette has been provided, embodying a unique continuous cycle for an entirely automatic operation of a projector, which cassette can be adapted for any type of motion-picture film independently of its size and length.

Figure 3:
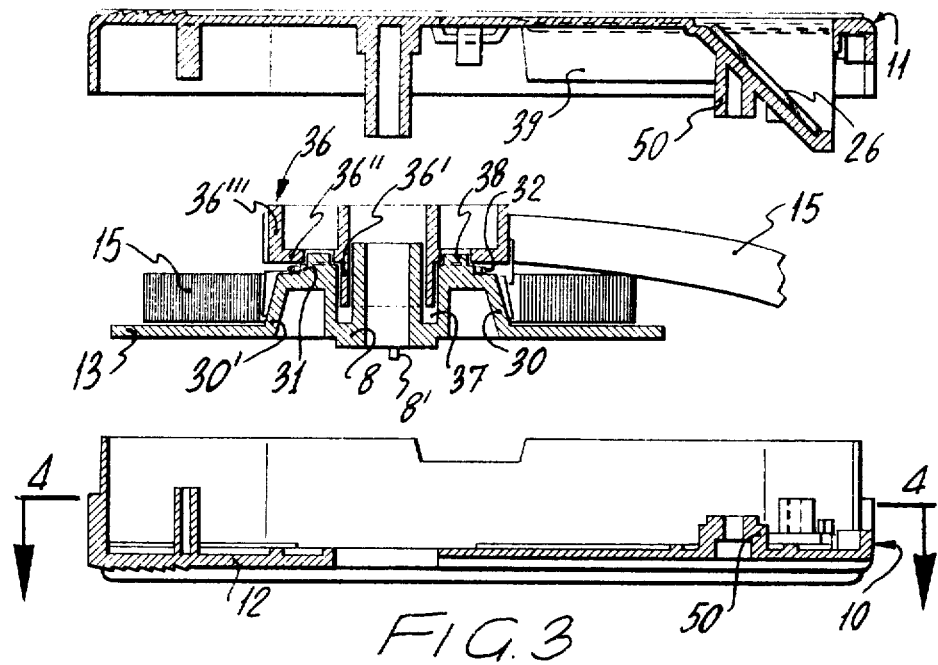
FIG. 3 is an exploded diametrical sectional view of a second embodiment of the magazine.
Figure 4:
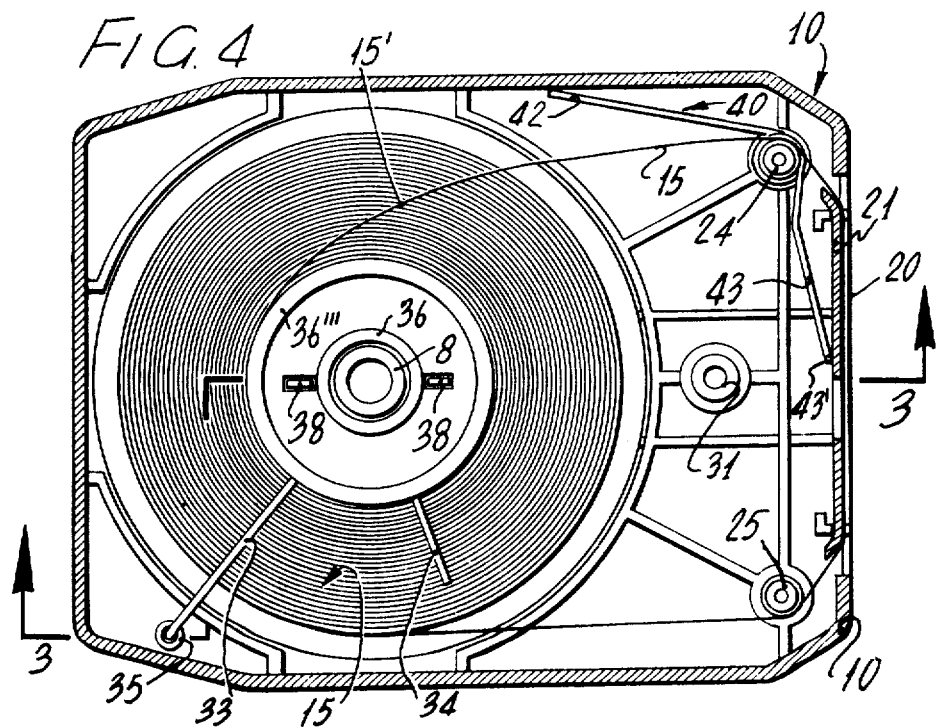
FIG. 4 is a plan view of the magazine shown in FIG. 3, with the lid and some fittings removed for showing the underlying parts.

As it will be seen in FIGS. 3 and 4, showing an improved modified embodiment, the cassette magazine still comprises a two-part housing, of which one part 10 forms the box and the other part 11 the lid; this housing carries the incoming and return guide rollers 24 and 25 for the film 15, respectively, inclined reflecting surface means 26 for light reception from a top opening and light reflection to the film frames to be projected. The inclined reflecting surface means 26 can be fast with the box 10 or lid 11.

Also in this case, the disc 13 is idly rotatably carried by the bottom 12 of said housing through a hub seat 8 accessible from the outside of the container through a hole formed in the bottom of box 10, when molding the container for enabling a positive control or drive from outside by the tooth 8' of the disc 13 carrying the continuously wound film 15.

The disc 13 inwardly carries a spool 30 fast and coaxial therewith, projecting from the disc plane for a height substantially equal to the width of the wound film and is of a substantially frustoconical shape, having its major base generally spaced apart from the disc for a short cylindrical length 30'. The minor base is preferably provided with a slightly banked or raised central zone 31 to accommodate and position an aligning or levelling element for the film turns 15, this element 32 generally comprising a metal wire which is at least partially eyelet curved for arranging about said central zone, and having two radial legs 33 and 34 (FIG. 4), the radial leg 33 being located at the position where the inner turn of the film to be projected starts to separate from the winding, and the other radial leg 34 at the position where the projected film winds up again on the film roll. The extension of the radial leg 33 is at least the same as the radius of the film roll and has a bent-over end portion for sliding engagement within a small guide cylinder 35, provided in said box 10, and the other leg 34 generally extends for a length less than the radius of the film roll 15. The two legs 33 and 34 form therebetween an angle which may vary, the best results being obtained with an angle of 54° between the two legs, as shown in FIG. 4. It is apparent that the turn levelling element 32 is free of effecting slight movements in a direction away from or to the box bottom. A pressing cup element 36 bears on the eyelet of the levelling element and is free of axially moving away from or to the box bottom, in this capability of movement being guided by a flange 36' extending within an annular cavity 37 coaxial with the cup 36 and guide spool 30 fast with said disc 13. On one of the two members (spool 30 and pressing element 36) teeth 38 can be provided for a mutual engagement, rendering them fast in the rotation, but axially free. As shown in FIG. 3, the pressing element 36 comprises an inner cylindrical portion 36', an annular bottom portion 36'' and an outer cylindrical portion 36''', interconnected and having rounded corners, with an external diameter slightly larger than the external diameter of* the adjoining spool 30. A small clearance is provided between the top surface of the pressing element 36 and the lid 11 of the closed container.

Thus, it will be seen that the levelling element 32 for the film turns 15 is not fixedly against the film roll 15, but with a freedom of movement with a force depending on the weight of said pressing element 36, which weight is to be suitably determined.

The alignment of the film turns 15 is accomplished through the cooperation of a tab 39 fast with the lid 11 in a radial direction and positioned between the location where the inner turn to be projected starts and the location reached by the projected film turn, the inner end of said tab 39 terminating adjacent the edge of the pressing element.

The magazine according to the present patent application has also a novel pressure spring 40 for the film presser pad 21. This spring is wound in a few turns about the film incoming guide roller 24 and operates between the inner wall of the box 10 and presser pad 21, that is one arm 42 thereof is directed against the wall of said box 10, while the other arm 43 is angle bent to arrange with its end 43' against the presser pad 21 just upstream of the projection window 22.

Another useful modification of this second embodiment of the container consists of incorporating within the housing 10, 11 means 50 for engaging the fastening screw 51 of the lid 11 to the container box 10.

As it will be particularly seen in FIG. 4, the film 15 unwinds from its innermost turn, forming a loop 15' between the spool 36 and the incoming guide roller 24, passes then between the presser pad 21 and the container wall where the projection window 22 is provided, in this zone being drawn by the projector claw or other feeding device, and then about the return roller 25 and is externally wound up again on the film roll 15 carried by the disc 13.

The magazine is of a substantially rectangular shape, having preferably beveled corners for an easy insertion and knurls for aiding in gripping.

Changes and modifications can be made also to this second embodiment of the invention without departing from the covering field thereof; for example, the levelling element 32 may be of several shapes and materials, still having radial arms 33, 34 for maintaining the film aligned, or similarly the pressing element 36 can take several shapes, or can be urged also by a suitably calibrated spring, besides by its own weight.

What is claimed is:

1. A cassette magazine for an endless motion picture film in the form of a wound roll comprising, in combination, a substantially flat container having a bottom wall provided with an access opening, a side wall and a top wall defining an interior, said side wall having a film exposure opening, said film being arranged to be advanced adjacent said film exposure opening to continuously unwind the innermost turn of the film roll and to wind the outermost turn of the roll on the outer periphery of the roll, a film roll supporting disc having a central hub rotatably mounted on said container bottom wall in said container interior in coaxial alignment with said bottom wall access opening for connection of said disc to associated projector driving means, a levelling member supported on said disc for retaining engagement with the side edges of the turns of film in the roll, said levelling member including a pair of radially extending arms arranged in angularly disposed relationship, one of said arms extending at least to the outer periphery of the film roll on said disc and the other of said arms having a free end terminating radially inward of the film roll outer periphery, means on said container engageable with said levelling member for preventing rotation of said levelling member and for permitting limited axial movement of said levelling member on said disc including a recess on said container for slidably accommodating the free end of said one arm, a spool supported on said disc in coaxial relationship therewith, said spool extending upwardly through the film roll on said disc and having an upper end disposed above the film roll adjacent said container top wall, said spool having a circular cross-sectional shape for guiding engagement with the innermost turn of the film roll on the disc during the advance of the film and to promote separation of the innermost turn of the film, a presser pad member in said container interior for maintaining the advancing film adjacent said film exposure opening, and means for guiding the advancing film from said spool to said presser pad member and means for guiding the advancing film from said presser pad member to the roll.

2. A cassette magazine in accordance with claim 1, wherein said hub is of frusto-conical shape extending upwardly to substantially the height of the film roll on said disc, and wherein said spool is supported on the upper end of said frusto-conical hub for axial movement relative thereto, means for connecting said spool and said hub together for rotation, said spool being of circular cross-sectional shape for guiding engagement with the innermost turn of the film roll on the said disc and defining with said hub an annular clearance space and wherein said levelling member is supported on said hub between said hub and said spool in said clearance space.

3. A cassette magazine in accordance with claim 2, wherein said levelling member is in the form of a wire having an intermediate portion supported on said hub within said clearance space and having free ends forming said arms, said one arm having a free end portion extending at substantially a right angle to said one arm for accommodation within said container recess in axial sliding engagement therewith.

4. A cassette magazine in accordance with claim 3, wherein said means for supporting said spool on said hub includes a downwardly depending sleeve on said spool and wherein said hub is provided with an upwardly opening annular recess for accommodating said sleeve to permit limited axial movement of said spool on said hub.

5. A cassette magazine in accordance with claim 4, wherein said means for connecting said hub and said spool together for rotation include at least one upstanding lug on said hub and wherein said spool is provided with at least one recess for accommodating said lug in the supported position of said spool on said hub.

6. A cassette magazine in accordance with claim 5, including at least one downwardly depending tab on the top wall of said container for further guiding the advancing film between said spool and said presser pad member.

* * * * *